United States Patent
Murata et al.

(10) Patent No.: US 7,718,257 B2
(45) Date of Patent: *May 18, 2010

(54) HEAT-PEELABLE PRESSURE-SENSITIVE ADHESIVE SHEET

(75) Inventors: Akihisa Murata, Ibaraki (JP); Toshiyuki Oshima, Ibaraki (JP); Yukio Arimitsu, Ibaraki (JP); Kazuyuki Kiuchi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 1314 days.

This patent is subject to a terminal disclaimer.

(21) Appl. No.: 10/415,948

(22) PCT Filed: Nov. 7, 2001

(86) PCT No.: PCT/JP01/09743
§ 371 (c)(1),
(2), (4) Date: May 7, 2003

(87) PCT Pub. No.: WO02/38691
PCT Pub. Date: May 16, 2002

(65) Prior Publication Data
US 2004/0038020 A1    Feb. 26, 2004

(30) Foreign Application Priority Data
Nov. 8, 2000    (JP)    ............... 2000-340922

(51) Int. Cl.
B32B 7/12    (2006.01)
B32B 33/00    (2006.01)
B32B 27/00    (2006.01)

(52) U.S. Cl. ................... 428/354; 428/343; 428/355 R; 428/346; 428/40.1; 428/41.7; 428/41.8; 428/317.1

(58) Field of Classification Search .............. 428/317.3, 428/317.5, 343, 40.1, 346, 354; 442/149, 442/150
See application file for complete search history.

(56) References Cited

U.S. PATENT DOCUMENTS 5,032,438 A * 7/1991 Sakumoto et al. .......... 428/41.8
5,441,810 A * 8/1995 Aizawa et al. .............. 428/354

(Continued)

FOREIGN PATENT DOCUMENTS

EP    1097977 A2 *  5/2001

(Continued)

OTHER PUBLICATIONS

Machine Translation of JP 11-166164, published Jun. 22, 1999.*

(Continued)

*Primary Examiner*—Callie E Shosho
*Assistant Examiner*—Anish Desai
(74) *Attorney, Agent, or Firm*—Sughrue Mion, PLLC

(57) ABSTRACT

A heat-peelable pressure-sensitive adhesive sheet comprises: a base material; and a thermo-expandable pressure-sensitive adhesive layer containing thermo-expandable microspheres, the thermo-expandable pressure-sensitive adhesive layer having a surface to be adhered to an adherend, wherein the surface of the thermo-expandable pressure-sensitive adhesive layer before subjecting to heating has a centerline average roughness of greater than 0.4 µm, and has a convex portion resulting from the thermo-expandable microspheres.

6 Claims, 1 Drawing Sheet

U.S. PATENT DOCUMENTS

| | | | |
|---|---|---|---|
| 5,609,954 A | 3/1997 | Aizawa et al. | |
| 6,488,803 B2 | 12/2002 | Kiuchi et al. | |
| 6,998,175 B2 * | 2/2006 | Murata et al. | 428/354 |
| 2001/0020515 A1 * | 9/2001 | Shibata et al. | 156/329 |
| 2001/0055678 A1 * | 12/2001 | Murata et al. | 428/346 |
| 2002/0192463 A1 | 12/2002 | Kiuchi et al. | |
| 2003/0203193 A1 * | 10/2003 | Murata et al. | 428/343 |
| 2004/0038020 A1 * | 2/2004 | Murata et al. | 428/317.1 |

FOREIGN PATENT DOCUMENTS

| | | |
|---|---|---|
| JP | 56-61467 A | 5/1981 |
| JP | 63-33487 A | 2/1988 |
| JP | 2-305878 A | 12/1990 |
| JP | 5-43851 A | 2/1993 |
| JP | 11 166164 A | 6/1999 |

OTHER PUBLICATIONS

Kaoru et al., "Thermally Peelable Adhesive and Self-Adhesive Member", Machine translation of JP 06-184504, Sep. 14, 1992.*
Patent Abstracts of Japan vol. 1999, No. 11, Sep. 30, 1999.
U.S. Appl. No. 10/404,861, Murata et al., filed Apr. 2, 2003.
U.S. Appl. No. 10/400,792, Kiuchi et al., filed Mar. 28, 2003.

* cited by examiner

HEAT-PEELABLE PRESSURE-SENSITIVE ADHESIVE SHEET

This application is based on a Japanese patent application JP 2000-340922, filed Nov. 8, 2000, the entire content of which is hereby incorporated by reference, the same as if set forth at length.

TECHNICAL FIELD

The present invention relates to a heat-peelable pressure-sensitive adhesive easily and efficiently releasable from an adherend at desired time by a short-time heat treatment.

BACKGROUND ART

Heat-peelable pressure-sensitive adhesive sheets obtained by disposing, on a base material, a pressure-sensitive adhesive layer containing a blowing or expanding agent such as thermo-expandable microspheres are conventionally known (JP-B-50-13878, JP-B-51-24534, JP-A-56-61468, JP-A-56-61469, JP-A-60-252681, etc.). These heat-peelable pressure-sensitive adhesive sheets are developed to satisfy both adhesion and releasability after use. They are easily releasable from an adherend by heating to foam or expand the blowing agent, thereby lowering adhesion. By making use of such a feature, they have been used as a temporary supporting means upon production of electronic parts and as labels for goods to be recycled.

When the adherend is to be bonded at a relatively large area or is made of a material, such as metal, wettable with an adhesive (a material having a relatively high surface energy), releasability lowers, thereby sometimes making it difficult to maintain good releasability after heating.

DISCLOSURE OF THE INVENTION

An object of the invention is therefore to provide a heat-peelable pressure-sensitive adhesive sheet capable of exhibiting excellent releasability after heating while maintaining excellent adhesion before heating, even if the area of the adherend to be bonded is relatively large.

Another object of the invention is to provide a heat-peelable pressure-sensitive adhesive sheet having good adhesion before heating and good releasability after heating even if the adherend is made of a material having a relatively high surface energy such as metal.

As a result of extensive investigation with a view toward attaining the above-described objects, the present inventors have found that by using a heat-peelable pressure-sensitive adhesive sheet wherein the centerline average roughness on the surface of the thermo-expandable pressure-sensitive adhesive layer containing thermo-expandable microspheres is greater than a specific value and the layer has, on the surface to be adhered to an adherend, convex portions resulting from the thermo-expandable microspheres, good releasability can be exhibited after heating even if the area of an adherend to be bonded is relatively large or the adherend is made of a material, such as metal, wettable with an adhesive, and completed the invention.

In the present invention, there is thus provided a heat-peelable pressure-sensitive adhesive sheet comprising: a base material; and a thermo-expandable pressure-sensitive adhesive layer containing thermo-expandable microspheres, provided at least one side of the base material, the thermo-expandable pressure-sensitive adhesive layer having an surface to be adhered to an adherend, wherein the surface of the thermo-expandable pressure-sensitive adhesive layer before subjecting to heating has a centerline average roughness of greater than 0.4 μm, and has a convex portion resulting from the thermo-expandable microspheres.

As the heat-peelable pressure-sensitive adhesive sheet according to the present invention, preferred is a sheet wherein the thermo-expandable microspheres having a particle size greater than the thickness of the thermo-expandable pressure-sensitive adhesive layer amount to 0.1 to 3 vol. % of the whole volume of the thermo-expandable microspheres.

The heat-peelable pressure-sensitive adhesive sheet according to the invention preferably has a rubber-like organic elastic layer between the base material and the thermo-expandable pressure-sensitive adhesive layer. It is especially preferred that the rubber-like organic elastic layer is formed of a tacky substance.

BEST MODE FOR CARRYING OUT THE INVENTION

Figure 1:
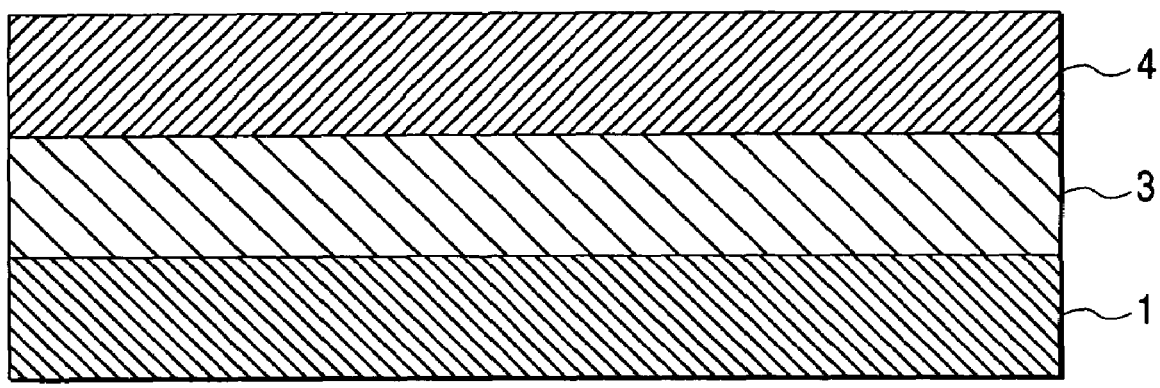
FIG. 1 is a schematic cross-sectional view illustrating one example of the heat-peelable pressure-sensitive adhesive sheet of the present invention.
Figure 2:
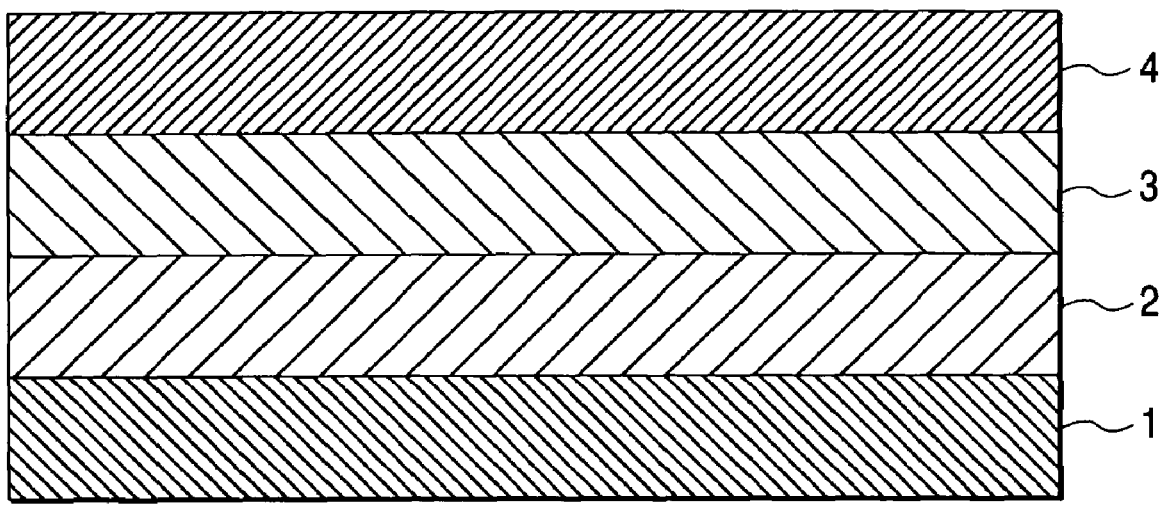
FIG. 2 is a schematic cross-sectional view illustrating another example of the heat-peelable pressure-sensitive adhesive sheet of the present invention.

The embodiments of the invention will hereinafter be described in detail with reference to accompanying drawings if necessary. The like reference numerals indicate the like members. FIG. 1 is a schematic cross-sectional view illustrating one example of the heat-peelable pressure-sensitive adhesive sheet of the invention; and FIG. 2 is a schematic cross-sectional view illustrating another example of the heat-peelable pressure-sensitive adhesive sheet of the invention.

In the example of FIG. 1, a thermo-expandable pressure-sensitive adhesive layer 3 is disposed on one side of a base material 1 and over the adhesive layer 3, a separator 4 is stacked. In the example of FIG. 2, a thermo-expandable pressure-sensitive adhesive layer 3 is disposed on one side of a base material 1 via a rubber-like organic elastic layer 2 and over the adhesive layer 3, a separator 4 is stacked.

(Thermo-Expandable Pressure-Sensitive Adhesive Layer)

The thermo-expandable pressure-sensitive adhesive layer 3 contains at least an adhesive for imparting the sheet with adhesion and thermo-expandable microspheres (microcapsules) for imparting the sheet with thermo-expandable properties. By heating the thermo-expandable pressure-sensitive adhesive layer 3 at desired time after adhesion of the pressure-sensitive adhesive sheet to an adherend, thereby foaming and/or expanding the thermo-expandable microspheres, the adhesion area of the thermo-expandable pressure-sensitive adhesive layer 3 with the adherend is decreased and the pressure-sensitive adhesive sheet can be released readily. Good releasability cannot be exhibited stably when the blowing agent has not been microencapsulated.

(Thermo-Expandable Microspheres)

The thermo-expandable microspheres can be selected as needed from known thermo-expandable microspheres. Those having a substance, which is easily gasified and expands by heating such as isobutane, propane or pentane, enclosed in an elastic shell can be used. The shell is usually made of a hot melt substance or a substance which is broken by thermal expansion. Examples of the shell forming substance include vinylidene chloride—acrylonitrile copolymer, polyvinyl alcohol, polyvinyl butyral, polymethyl methacrylate, polyacrylonitrile, polyvinylidene chloride and polysulfone. Thermo-expandable microspheres can be prepared in a conventional manner such as coacervation or interfacial polymerization. A commercially available product such as Matsumoto Microsphere [trade name; product of Matsumoto Yushi-Seiyaku Co., Ltd.] can also be used as the thermo-expandable microspheres.

In order to lower the adhesion of the pressure-sensitive adhesive layer efficiently by heating, the thermo-expandable microspheres preferably have a sufficient strength not to be broken until the volume expansion coefficient becomes 5 times or greater, more preferably 7 times or greater, especially 10 times or greater.

Although the amount of the thermo-expandable microspheres can be determined as needed depending on the expansion coefficient of the adhesive layer or lowering degree of the adhesion, it is usually, for example, 1 to 150 parts by weight, preferably 10 to 130 parts by weight, more preferably 25 to 100 parts by weight, based on 100 parts by weight of the base polymer constituting the thermo-expandable pressure-sensitive adhesive layer 3.

In the invention, the particle size of the thermo-expandable microspheres can be selected as needed depending on the thickness of the thermo-expandable pressure-sensitive adhesive layer. It is desired that the thermo-expandable microspheres having a particle size greater than thickness of the thermo-expandable pressure-sensitive adhesive layer 3 amount to preferably 0.1 to 3 vol. %, more preferably 0.2 to 2 vol. % based on the whole volume of the thermo-expandable microspheres. When the thermo-expandable microspheres having a greater particle size than the thickness of the thermo-expandable pressure-sensitive adhesive layer exceeds 3 vol. % of the whole volume of the thermo-expandable microspheres, it becomes difficult to maintain an effective adhesion area with the adherend before heating because the surface roughness of the thermo-expandable pressure-sensitive adhesive layer becomes excessively large. When the thermo-expandable microspheres having a greater particle size than the thickness of the thermo-expandable pressure-sensitive adhesive layer is less than 0.1 vol. % of the whole volume of the thermo-expandable microspheres, the surface roughness of the thermo-expandable pressure-sensitive adhesive layer is lost and releasability from the adherend after heating lowers.

No particular limitation is imposed on the average particle size of the thermo-expandable microspheres. It can be selected, for example, from a range of about 1 to 30 μm.

The particle size of the thermo-expandable microspheres may be adjusted during their formation procedure or by classification after formation.

(Adhesive)

As an adhesive to be used for the thermo-expandable pressure-sensitive adhesive layer 3, that not affecting the foaming and/or expansion of the thermo-expandable microspheres upon heating is preferred. As the adhesive, known adhesives such as rubber adhesives, acrylic adhesives, alkyl vinyl ether adhesives, silicone adhesives, polyester adhesives, polyamide adhesives, urethane adhesives and styrene-diene block copolymer adhesives and creeping-properties-improved adhesives obtained by incorporating a hot melt resin having a melting point of about 200° C. or less in the above-exemplified adhesive may be used either singly or in combination (refer to JP-A-56-61468, JP-A-61-174857, JP-A-63-17981 and JP-A-56-13040). The adhesive may contain, in addition to the tacky component (base polymer), a proper additive such as a crosslinking agent (ex. polyisocyanate and alkyletherified melamine compound), a tackifier (for example, made of a rosin derivative resin, polyterpene resin, petroleum resin or oil-soluble phenol resin and is in the form of a solid, semi-solid or liquid at normal temperature), a plasticizer, a filler and an antioxidant.

As the adhesive, usable are rubber adhesives having a base polymer selected from a natural rubber and various synthetic rubbers; and acrylic adhesives having, as a base polymer, an acrylic polymer (homopolymer or copolymer) obtained using one or more monomer components selected from alkyl(meth) acrylates (for example, (meth)acrylates of a $C_{1-20}$ alkyl such as methyl, ethyl, propyl, isopropyl, butyl, isobutyl, s-butyl, t-butyl, pentyl, hexyl, heptyl, octyl, 2-ethylhexyl, isooctyl, isodecyl, dodecyl, tridecyl, pentadecyl, hexadecyl, heptadecyl, octadecyl, nonadecyl or eicosyl).

The above-described acrylic polymer may contain, as needed, a unit corresponding to another monomer component copolymerizable with the alkyl methacrylate in order to improve cohesive power, heat resistance and crosslinking property. Examples of such a monomer component include carboxyl-containing monomers such as acrylic acid, methacrylic acid, carboxyethyl acrylate, carboxypentyl acrylate, itaconic acid, maleic acid and fumaric acid, crotonic acid; acid anhydride monomers such as maleic anhydride and itaconic anhydride; hydroxyl-containing monomers such as hydroxyethyl(meth)acrylate, hydroxypropyl(meth)acrylate, hydroxybutyl(meth)acrylate, hydroxyhexyl(meth)acrylate, hydroxyoctyl(meth)acrylate, hydroxydecyl(meth)acrylate, hydroxylauryl(meth)acrylate and (4-hydroxymethylcyclohexyl)methyl methacrylate; sulfonic-acid-containing monomers such as styrenesulfonic acid, allylsulfonic acid, 2-(meth)acrylamide-2-methylpropanesulfonic acid, (meth) acrylamidopropanesulfonic acid, sulfopropyl(meth)acrylate and (meth)acryloyloxynaphthalenesulfonic acid; (N-substituted)amide monomers such as (meth)acrylamide, N,N-dimethyl(meth)acrylamide, N-butyl(meth)acrylamide, N-methylol(meth)acrylamide and N-methylolpropane(meth) acrylamide; aminoalkyl(meth)acrylate monomers such as aminoethyl(meth)acrylate, N,N-dimethylaminoethyl(meth) acrylate and t-butylaminoethyl(meth)acrylate; alkoxyalkyl (meth)acrylate monomers such as methoxyethyl(meth)acrylate and ethoxyethyl(meth)acrylate; maleimide monomers such as N-cyclohexylmaleimide, N-isopropylmaleimide, N-laurylmaleimide and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide and N-laurylitaconimide; succinimide monomers such as N-(meth) acryloyloxymethylene succinimide, N-(meth)acryloyl-6-oxyhexamethylene succinimide and N-(meth)acryloyl-8-oxyoctamethylene succinimide; vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic amides, styrene, α-methylstyrene and N-vinylcaprolactam; cyanoacrylate monomers such as acrylonitrile and methacrylonitrile; epoxy-containing acrylic monomers such as glycidyl(meth)acrylate; glycol acrylate monomers such as polyethylene glycol(meth)acrylate, polypropylene glycol (meth)acrylate, methoxyethylene glycol(meth)acrylate and methoxypropylene glycol(meth)acrylate; hetero-ring-containing, halogen-atom-containing or silicon-atom-containing acrylate monomers such as tetrahydrofurfuryl(meth)acrylate, fluorine(meth)acrylate and silicone(meth)acrylate; polyfunctional monomers such as hexanediol di(meth)acrylate, (poly)

ethylene glycol di(meth)acrylate, (poly)propylene glycol di(meth)acrylate, neopentyl glycol di(meth)acrylate, pentaerythritol di(meth)acrylate, trimethylol propane tri(meth)acrylate, pentaerythritol tri(meth)acrylate, trimethylol propane tri(meth)acrylate, pentaerythritol tri(meth)acrylate, dipentaerythritol hexa(meth)acrylate, epoxy acrylate, polyester acrylate and urethane acrylate; olefinic monomers such as isoprene, butadiene and isobutylene; and vinyl ether monomers such as vinyl ether. These monomers may be used either singly or in combination.

From the viewpoints of balance between proper adhesion before heat treatment and lowering of adhesion after heat treatment, an adhesive using, as a base, a polymer having a dynamic modulus of elasticity of 50,000 to 10,000,000 (dyn/cm$^2$) at normal temperature to 150° C. is preferred.

The thermo-expandable pressure-sensitive adhesive layer 3 can be formed in a conventional manner, for example, by preparing a coating solution containing an adhesive and thermo-expandable microspheres by using a solvent if necessary, and then applying the resulting solution to a base material 1 or a rubber-like organic elastic layer 2; or by applying the above-described coating solution onto a proper separator (release paper, etc.) to form a thermo-expandable pressure-sensitive adhesive layer and then transferring it to the base material 1 or rubber-like organic elastic layer 2. The thermo-expandable pressure-sensitive adhesive layer 3 may be formed of a single layer or plural layers.

The thickness of the thermo-expandable pressure-sensitive adhesive layer 3 is preferably 300 μm or less, especially 100 μm or less. When the layer is too thick, cohesion failure occurs upon release after heat treatment, whereby the adhesive remains on the adherend and tends to contaminate it. When the layer is too thin, on the other hand, deformation degree of the thermo-expandable pressure-sensitive adhesive layer 3 by heat treatment is not satisfactorily large, making it difficult to lower the adhesion smoothly or causing necessity to excessively reduce the particle size of thermo-expandable microspheres to be added. In consideration of them, the thickness of the thermo-expandable pressure-sensitive adhesive layer 3 is preferably 5 μm or greater, more preferably 10 μm or greater, especially 15 μm or greater.

(Base Material)

The base material 1 serves as a supporting base for the thermo-expandable pressure-sensitive adhesive layer 3. Plastic films or sheets are usually employed. In addition, any thin substance such as paper, cloth, nonwoven cloth or metal foil, or laminate thereof with plastic, or laminate of plastic films (or sheets) is also usable. The thickness of the base material 1 is usually, but not limited to, 500 μm or less, preferably 1 to 300 μm, more preferably 5 to 250 μm. In order to heighten adhesion with the thermo-expandable pressure-sensitive adhesive layer 3, the base material 1 may be subjected to ordinarily employed surface treatment, for example, chemical or physical oxidizing treatment such as chromic acid treatment, exposure to ozone, exposure to a flame, exposure to a high-pressure electric shock or ionizing radiation. The base material 1 may be coated with a releasing agent such as silicone resin or fluorine resin for imparting it with releasability from the thermo-expandable pressure-sensitive adhesive layer 3.

The base material 1 includes a low adhesion type base material and a high adhesion type base material. Examples of the former one include base materials made of a nonpolar polymer, for example, an olefin resin such as polyethylene or polypropylene and base materials having a surface coated with the above-described releasing agent. Examples of the latter one include base materials made of a high polarity polymer such as polyester and base materials having a surface subjected to oxidizing treatment by the above-described chemical or physical method.

The low adhesion type base material is used as a base material for a base-material-release type pressure-sensitive adhesive sheet permitting easy release of the base material from the layer thereon. The base-material-release type pressure-sensitive adhesive sheet is usable, for example, as a temporary adhesive for bonding the sheet to one adherend (a), leaving the thermo-expandable pressure-sensitive adhesive layer on the adherend (a) while peeling the base material and bonding another adherend (b) to this thermo-expandable pressure-sensitive adhesive layer. When release of this adhesion state is desired, the adherends (a) and (b) can easily be separated by heating. The high adhesion type base material, on the other hand, is usable as a base material for a base-material-sealing type pressure-sensitive adhesive sheet wherein the base material and a layer thereon have been adhered strongly. In such a base-material-sealing type pressure-sensitive adhesive sheet, the base material can be bonded to the adherend with a predetermined adhesive force and at the same time, they can be released or separated easily by heating when release of the adhesion state is desired.

(Rubber-Like Organic Elastic Layer)

The rubber-like organic elastic layer 2 has two functions, one is to make the surface of the heat-peelable pressure-sensitive adhesive sheet to faithfully follow the surface shape of an adherend, thereby increasing the adhesion area upon adhesion of the sheet with the adherend and the other is to highly control thermal expansion of the thermo-expandable layer, thereby uniformly expanding the thermo-expandable layer preferentially to the thickness direction upon release of the sheet from the adherend by heating.

For acquiring the above-described functions, the rubber-like organic elastic layer 2 is preferably formed from a natural rubber, synthetic rubber or rubber-elasticity-having synthetic resin having a D type shore D hardness, based on ASTM D-2240, of 50 or less, especially 40 or less.

Examples of the synthetic rubber or synthetic resin having rubber elasticity include synthetic rubbers such as nitrile, diene and acrylic rubbers; thermoplastic elastomers such as polyolefin and polyester elastomers; and synthetic resins having rubber elasticity such as ethylene-vinyl acetate copolymer, polyurethane, polybutadiene and soft polyvinyl chloride. Polyvinyl chloride is essentially a hard polymer, but it can exhibits rubber elasticity depending on the combination with a blending agent such as plasticizer or softener. Such a composition is also usable as a constituent for the rubber organic elastic layer. A tacky substance such as adhesive, which will be described later and constitutes the thermo-expandable pressure-sensitive adhesive layer 3 is also preferred as a constituent of the rubber-like organic elastic layer 2.

The thickness of the rubber-like organic elastic layer 2 is usually 500 μm or less (for example, 1 to 50 μm), preferably 3 to 300 μm, more preferably 5 to 150 μm.

The rubber-like organic elastic layer 2 can be formed by a proper method, for example, by applying onto the base material 1 a coating solution containing an elastic layer forming material such as the above-described natural rubber, synthetic rubber or synthetic resin having rubber elasticity (coating method); by causing the base material 1 to adhere with a film made of the above-described elastic layer forming material or a laminate film, which has been formed in advance by stacking a layer of the elastic layer forming material on at least one thermo-expandable pressure-sensitive adhesive layer 3 (dry laminate method); or by coextrusion of a resin composition containing the constituent of the base material 1 and another resin composition containing the above-described elastic layer forming material (coextrusion method).

The rubber-like organic elastic layer 2 may be formed of a tacky substance composed mainly of a natural rubber, synthetic rubber or synthetic resin having rubber elasticity, or alternatively, it may be formed of a foamed film composed mainly of such a component. Foaming can be carried out in a conventional manner, for example, by mechanical stirring, a method using a reaction gas, a method using a blowing agent, removing a soluble substance, spraying method, forming a syntactic foam, or sintering method. The rubber-like organic elastic layer 2 may be composed of a single layer or plural layers.

(Separator)

In the present invention, conventionally used release paper is usable as the separator 4. The separator 4 serves as a protecting material of the thermo-expandable pressure-sensitive adhesive layer 3 and it is released when the pressure-sensitive adhesive sheet is adhered to an adherend. The separator 4 is not always necessary.

The thermo-expandable pressure-sensitive adhesive layer 3 can be formed not only one side of the base material 1 but also both sides. If necessary, the rubber-like organic elastic layer 2 can also be disposed on one side or both sides of the base material 1. On one side of the base material 1, the thermo-expandable pressure-sensitive adhesive layer 3 may be disposed and on the opposite side, an ordinarily employed adhesion layer not containing thermo-expandable microspheres may be disposed. Alternatively, an intermediate layer such as undercoating layer or adhesive layer may be disposed between the base material 1 and the rubber-like organic elastic layer 2, or between the rubber-like organic elastic layer 2 and the thermo-expandable pressure-sensitive adhesive layer 3.

(Heat-Peelable Pressure-Sensitive Adhesive Sheet)

What is important for the heat-peelable pressure-sensitive adhesive sheet of the present invention is that it exhibits good adhesion and, for heightening releasability by heating, the centerline average roughness on the surface of the thermo-expandable pressure-sensitive adhesive layer before heating is greater than 0.4 µm (exceeding 0.4 µm). The centerline average roughness can be selected from a range, for example, greater than 0.4 µm but not greater than 2 µm, preferably from 0.45 µm to 1 µm. When the centerline average roughness is 0.4 µm or less, the surface roughness of the thermo-expandable pressure-sensitive adhesive layer decreases, resulting in lowering of releasability from the adherend after heating.

The maximum roughness on the surface of the thermo-expandable pressure-sensitive adhesive layer before heating is preferably 5 µm or less (for example, 0.5 to 5 µm), especially 4 µm or less (for example, 0.5 to 4 µm).

The centerline average roughness or the maximum roughness on the surface of the thermo-expandable pressure-sensitive adhesive layer before heating can be regulated by properly selecting the thickness of the thermo-expandable pressure-sensitive adhesive layer 3 or the particle size of the thermo-expandable microspheres to be added to the pressure-sensitive adhesive layer.

For the heat-peelable pressure-sensitive adhesive sheet of the present invention, it is important to have, on the surface to be adhered to an adherend of the thermo-expandable pressure-sensitive adhesive layer before heating, convex portions attributable to the thermo-expandable microspheres. No particular limitation is imposed on the size or height of the convex portions and it can be selected as needed depending on the thermo-expandable microspheres having a particle size greater than the thickness of the thermo-expandable pressure-sensitive adhesive layer. In addition, no particular limitation is imposed on the number or ratio of the convex portions and it can be selected as needed depending on the number or content of the thermo-expandable microspheres having a particle size greater than the thickness of the thermo-expandable pressure-sensitive adhesive layer.

Since the heat-peelable pressure-sensitive adhesive sheet of the present invention has centerline average roughness greater than 0.4 µm on the surface of the thermo-expandable pressure-sensitive adhesive layer before heating, and has, on the surface to be adhered to an adherend, convex portions attributable to the thermo-expandable microspheres, a release-causing deformation force of these convex portions can be allowed to effectively act on the adjacent interface of an adherend in an initial stage of thermal release of the adherend, even if the adherend has a relatively large adhesion area or the adherend (ex. metal) is wettable with an adhesive. The sheet can therefore exhibit good thermal releasability.

Owing to the thermo-expandable microspheres of the thermo-expandable pressure-sensitive adhesive layer, the adherend can be bonded at a predetermined adhesion force and adhesion state can easily be released by heating.

When the maximum roughness on the surface of the thermo-expandable pressure-sensitive adhesive layer before heating is adjusted to 5 µm or less, an effective contact area can be secured even if the area to be adhered with the adherend becomes small, for example, as in the cutting step of chips, making it possible to suppress inconveniences, such as chipping or unintentional movement (vibration), due to insufficient adhesion force, and in turn, to prevent lowering in the productivity or yield.

In the heat-peelable pressure-sensitive adhesive sheet having a rubber-like organic elastic layer disposed between the base material and the thermo-expandable pressure-sensitive adhesive layer, owing to elasticity of the rubber-like organic elastic layer, the surface of the pressure-sensitive adhesive sheet faithfully follows the surface shape of the adherend upon bonding the pressure-sensitive adhesive sheet to the adherend, making it possible to increase the adhesion area, thereby heightening the adhesion strength. Upon release by heating, the expansion (volumetric change) of the thermo-expandable layer can be conducted uniformly in preference to the thickness direction under control with good precision, which facilitates release further. Even if the thermo-expandable microspheres contained in the thermo-expandable pressure-sensitive adhesive layer have an improperly large particle size, unevenness resulting therefrom is absorbed by the rubber-like organic elastic layer so that the surface roughness of the thermo-expandable pressure-sensitive adhesive layer can be suppressed to small.

The heat-peelable pressure-sensitive adhesive sheet of the invention has advantages as described above so that it can be used for permanent adhesion of an adherend made of a proper substance, but also it is suited for use in the case where release of adhesion of an adherend, after a predetermined time of adhesion and attainment of the adhesion purpose, is requested or desired. It is particularly suited as a temporary fixing member used upon processing of electronic parts, because a conventional heat-peelable pressure-sensitive adhesive sheet is not suited for such a purpose because relatively large adhesion area or wettability with the adhesive inhibits sufficient releasability.

Heating conditions for facilitating release of the pressure-sensitive adhesive sheet of the invention from an adherend can be set as needed in consideration of a decrease in adhesion area depending on the surface condition of the adherend or kind of the thermo-expandable microspheres, or conditions such as heat resistance of the base material or adherend, and heating method. Heating is usually conducted at 100° C. to 250° C. for 1 to 90 seconds (hot plate) or 5 to 15 minutes (hot air drier). Under such heating conditions, the thermo-expandable microspheres of the pressure-sensitive adhesive layer expand and/or foam to cause deformation of the pressure-sensitive adhesive layer, whereby adhesion force is decreased or lost. Heat treatment can be conducted in any stage depending on the using purpose. As a heating source, an infrared lamp or heating water may be sometimes usable.

The present invention will hereinafter be described in further detail by examples. It should however be borne in mind that the invention is not limited by these examples. A particle size is measured using "SALD-2000J" (trade name; a laser diffraction particle size analyzer manufactured by Shimadzu Corp.). The particle size (particle size distribution) or a ratio (content) of particles having a specific particle size is a measured value based on volume unless otherwise specifically described.

EXAMPLE 1

A toluene solution was prepared by incorporating 30 parts by weight of thermo-expandable microspheres A ("Matsumoto Microspheres F-50D", trade name; product of Matsumoto Yushi-Seiyaku Co., Ltd., average particle size: 13.4 μm, containing 1.5 vol. % of particles having a particle size of 30 μm or greater) in 100 parts by weight of a 2-ethylhexyl acrylate—ethyl acrylate—methyl methacrylate copolymer type pressure-sensitive adhesive. The resulting toluene solution was applied to a polyester film of 100 μm thick to give a dry thickness of 30 μm, followed by drying, whereby a thermo-expandable pressure-sensitive adhesive layer was formed and as a result, a heat-peelable pressure-sensitive adhesive sheet was prepared.

Convex portions were visually recognized from the surface to be adhered to an adherend on the thermo-expandable pressure-sensitive adhesive layer. These convex portions include convex portions due to thermo-expandable microspheres having a particle size greater than the thickness of the pressure-sensitive adhesive layer. The details of the convex portions on the surface to be adhered to an adherend can be visually observed by a microscope.

The above-described 2-ethylhexyl acrylate—ethyl acrylate—methyl methacrylate copolymer type pressure-sensitive adhesive is composed of 50 parts by weight of 2-ethylhexyl acrylate, 50 parts by weight of ethyl acrylate and 5 parts by weight of methyl methacrylate.

EXAMPLE 2

The thermo-expandable microspheres A were classified by a centrifugal wind-force classifier, whereby classified thermo-expandable microspheres B (average particle size: 19.9 μm, containing 1.7 vol. % of particles having a particle size of 50 μm or greater) were obtained.

A toluene solution was prepared by incorporating 50 parts by weight of the thermo-expandable microspheres B in 100 parts by weight (containing 5 parts by weight of a polyurethane crosslinking agent) of a butyl acrylate, ethyl acrylate—acrylic acid copolymer type pressure-sensitive adhesive. The resulting solution was applied to a polyester film of 100 μm thick to give a dry thickness of 50 μm, followed by drying, whereby a thermo-expandable pressure-sensitive adhesive layer was formed, and thus, a heat-peelable pressure-sensitive adhesive sheet was obtained.

On the thermo-expandable pressure-sensitive adhesive layer, convex portions were visually recognized on the surface to be adhered to an adherend. These convex portions include convex portions attributable to the thermo-expandable microspheres having a particle size greater than the thickness of the thermo-expandable pressure-sensitive adhesive layer.

COMPARATIVE EXAMPLE 1

The thermo-expandable microspheres A were classified by a centrifugal wind-force classifier, whereby classified thermo-expandable microspheres C (average particle size: 10.2 μm, free of particles having a particle size of 30 μm or greater) were obtained.

In a similar manner to Example 1 except for the use of the thermo-expandable microspheres C instead, a heat-peelable pressure-sensitive adhesive sheet was obtained. No convex portion was recognized on the surface to be adhered to an adherend of the thermo-expandable pressure-sensitive adhesive layer.

COMPARATIVE EXAMPLE 2

In a similar manner to Example 2 except for the use of thermo-expandable microspheres D ("Matsumoto Microspheres F-301D", trade name; product of Mtsumoto Yushi Seiyaku, average particle size: 11.6 μm, free of particles having a particle size of 50 μm or greater), a heat-peelable pressure-sensitive adhesive sheet was obtained. No convex portion was visually recognized on the surface to be adhered to an adherend of the thermo-expandable pressure-sensitive adhesive layer.

Evaluation Test

Centerline average roughness on the thermo-expandable pressure-sensitive adhesive layer before heating, 180° peel strength (adhesion) (N/20 mm) to a SUS 304BA plate and thermal releasability of each of the pressure-sensitive adhesive sheets obtained in Examples and Comparative Examples were measured. The results are shown in Table 1.

Measuring Method of Centerline Average Roughness

Centerline average roughness on the surface of the thermo-expandable pressure-sensitive adhesive layer of each of the sheets obtained in Examples and Comparative Examples is measured under the below-described conditions by using a non-contact surface roughness meter ("Micromap", product of Ryuka Systems Inc.). Evaluation results are shown in the column of "centerline average roughness (μm)" of FIG. 1.

Objective lens: 50× magnification, Measuring mode: WAVE560, FORMAT: 640×480, CAMERA: HITACHI KPMIU⅔, Body Tube: 1×body, Relay Lanze: No relay Measuring method of adhesion to SUS304BA 180° peel strength (adhesion strength) (N/20 mm) relative to SUS304BA plate is measured as described below. The evaluation results are shown in the column of "adhesion (N/200 mm)" in Table 1.

The surface of the thermo-expandable pressure-sensitive adhesive layer of each of the pressure-sensitive adhesive sheets (20 mm wide) obtained in Examples and Comparative Examples was bonded to an SUS304BA plate (after ultrasonic washing with toluene) by a single reciprocation of a 2 kg roller and 180° peel strength (adhesion) (N/20 mm) before heating and after heating were measured (peeling rate: 300 mm/min, temperature: 23±2° C., humidity: 65±5% RH, the pressure-sensitive sheet was released).

Measuring Method of Thermal Releasability

The thermal releasability is studied as described below. Measuring results are shown in the column of "thermal releasability" of Table 1.

The surface of the thermo-expandable pressure-sensitive adhesive layer of each of the pressure-sensitive adhesive sheets obtained in Examples and Comparative Examples was bonded to an SUS304BA plate (after ultrasonic washing with toluene) by a single reciprocation of a 2 kg roller. Whether the pressure-sensitive adhesive sheet peeled from the SUS304BA plate only by heating at 130 or 100° C. (130° C. for Examples 1 and 2, Comparative Example 1, 100° C. for Comparative Example 2) for 10 minutes by using a thermostat (hot air drier) ("SPH-201", product of TABAI ESPEC CORP.) was studied and the results were evaluated based on the following standards.

[Evaluation Standards]
A: The sheet peeled only by heating
B: The sheet did not peel by heating

TABLE 1

|  |  | Thickness of the layer (μm) | The number of particles greater than the thickness of the layer | Convex portions | Centerline average roughness (μm) | Adhesion (N/20 mm) | Thermal releasability |
|---|---|---|---|---|---|---|---|
| Ex. | 1 | 30 | 1.5 | Observed | 0.49 | 0.82 | A |
|  | 2 | 50 | 1.7 | Observed | 0.80 | 13.2 | A |
| Comp. Ex. | 1 | 30 | 0 | Not observed | 0.11 | 0.85 | B |
|  | 2 | 50 | 0 | Not observed | 0.22 | 13.9 | B |

In Table 1, the term "thickness of layer (μm)" means the thickness of the thermo-expandable pressure-sensitive adhesive layer of each pressure-sensitive adhesive sheet. The term "the number of particles greater than the thickness of the layer (%)" means a content (vol. %) of thermo-expandable microspheres having a particle size greater than the thickness (μm) of the thermo-expandable pressure-sensitive adhesive layer. The term "convex portions" means presence or absence of the convex portions formed on the surface to be adhered to an adherend of the thermo-expandable pressure-sensitive adhesive layer. Existence of the convex portions is expressed by "observed", while absence of them is expressed by "not observed".

As is apparent from Table 1, the pressure-sensitive adhesive sheets obtained in Examples 1 and 2 are released only by heating in a hot air drier. Since the pressure-sensitive adhesive sheet has a centerline average roughness, on the surface of the thermo-expandable pressure-sensitive adhesive layer, greater than 0.4 μm and it has, on the surface to be adhered to an adherend, convex portions attributable to the thermo-expandable microspheres, the deforming force of the convex portions on the surface to be adhered to an adherend attributable to the thermo-expandable microspheres can be allowed to act on the adjacent adherend interface effectively in the initial stage of thermal release, leading to exhibition of good thermal releasability. Effective use of thermo-expandable microspheres having a particle size greater than the thickness of the thermo-expandable pressure-sensitive adhesive layer is presumed to bring about this advantage.

On the other hand, the pressure-sensitive adhesive sheets obtained in Comparative Examples 1 and 2 did were not peeled only by heating in a hot air drier in spite that they are similar or almost similar in adhesion or thickness of thermo-expandable pressure-sensitive adhesive layer to the sheets obtained in Examples.

INDUSTRIAL APPLICABILITY

The heat-peelable pressure-sensitive adhesive sheet of the invention is useful as a temporary fixing tape to be used upon processing of electronic parts, because it exhibits excellent releasability after heating while having excellent adhesion before heating even if an adherend has a relatively large adhesion area or the adherend is wettable with an adhesive.

The invention claimed is:

1. A heat-peelable pressure-sensitive adhesive sheet comprising: a base material; and a thermo-expandable pressure-sensitive adhesive layer containing thermo-expandable microspheres, the thermo-expandable pressure-sensitive adhesive layer having a surface to be adhered to an adherend,
   wherein the surface of the thermo-expandable pressure-sensitive adhesive layer before subjecting to heating has a centerline average roughness of greater than 0.4 μm, and has a convex portion resulting from the thermo-expandable microspheres.

2. A heat-peelable pressure-sensitive adhesive sheet according to claim 1, further comprising a rubber-like organic elastic layer between the base material and the thermo-expandable pressure-sensitive adhesive layer.

3. A heat-peelable pressure-sensitive adhesive sheet according to claim 2, wherein the rubber-like organic elastic layer comprises a tacky substance.

4. A heat-peelable pressure-sensitive adhesive sheet comprising: a base material; and a thermo-expandable pressure-sensitive adhesive layer containing thermo-expandable microspheres, the thermo-expandable pressure-sensitive adhesive layer having a surface to be adhered to an adherend,
   wherein the surface of the thermo-expandable pressure-sensitive adhesive layer before subjecting to heating has a centerline average roughness of greater than 0.4 μm, and has a convex portion resulting from the thermo-expandable microspheres, and
   wherein the thermo-expandable microspheres having a particle size greater than the thickness of the thermo-expandable pressure-sensitive adhesive layer amount to 0.1 to 3 vol. % of the whole volume of the thermo-expandable microspheres.

5. A heat-peelable pressure-sensitive adhesive sheet according to claim 2, further comprising a rubber-like organic elastic layer between the base material and the thermo-expandable pressure-sensitive adhesive layer.

6. A heat-peelable pressure-sensitive adhesive sheet according to claim 5 wherein the rubber-like organic elastic layer comprises a tacky substance.

* * * * *